F. A. NAGEL.
TIRE FILLER.
APPLICATION FILED AUG. 26, 1919.
1,362,731.
Patented Dec. 21, 1920.
Fig. 1.
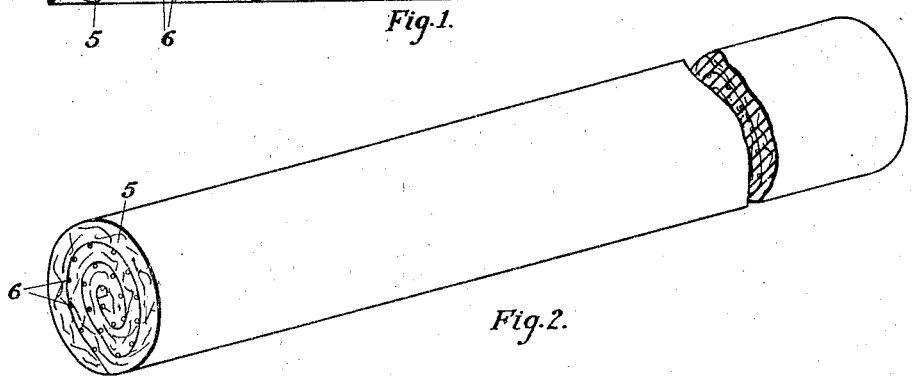
Fig. 2.
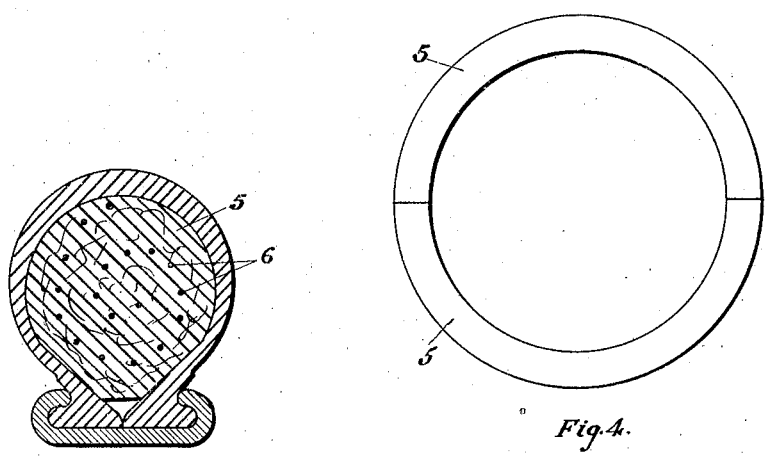
Fig. 3.
Fig. 4.
Inventor
Frank A. Nagel.
By
Attorneys

UNITED STATES PATENT OFFICE.

FRANK A. NAGEL, OF CICERO, ILLINOIS.

TIRE-FILLER.

1,362,731.  Specification of Letters Patent.  Patented Dec. 21, 1920.

Application filed August 26, 1919. Serial No. 319,955.

*To all whom it may concern:*

Be it known that I, FRANK A. NAGEL, a citizen of the United States, residing at Cicero, in the county of Cook and State of Illinois, have invented new and useful Improvements in Tire-Fillers, of which the following is a specification.

This invention relates to fillers or cores for tire casings by which the use of an inflatable inner tube is dispensed with.

The invention has for its object to provide a filler of novel and improved construction which will retain its shape and resiliency under load, and which is light, and imparts a maximum resiliency to the tire.

The object stated is attained by means of a combination and arrangement of parts to be hereinafter described and claimed, and in order that the same may be better understood, reference is had to the accompanying drawing forming a part of this specification.

In the drawing,

Figures 1 and 2 are perspective views illustrating the method or process of forming the filler;

Fig. 3 is a cross section of a tire with the filler, and

Fig. 4 is an elevation of the filler showing the two sections thereof.

Referring specifically to the drawing, the filler is a strip of elastic material having a cross sectional contour conforming to that of the interior of the tire casing. A complete filler or core for the tire will be in two lengths, each section being normally straight, instead of half-round. The combined length of the two sections will be such that they extend completely around the casing, and as they are flexible they readily bend to assume a circular form. By making the filler in two sections, they are made to fit the tire casing more snugly on account of their tendency to expand back to their normal straight shape.

In the manufacture of the filler, live rubber is employed, such as small pieces and scraps from old discarded inner tubes. These are placed in a vat and a cement is poured over the mass, and the same is heated until the particles hold together well, yet may be molded. The mass is now removed from the vat and rolled on a flat surface until it becomes a sheet having a thickness of three-eighths of an inch or thereabout. This sheet is cut to rectangular shape and coated on one side with cement, and on the coated side are laid cotton strands in longitudinal and parallel relation. Fig. 1 shows this sheet, the same being denoted by the reference character 5, and the strands being shown at 6. The sheet is next rolled into cylindrical form as shown in Fig. 2 so that the strands are embedded in the roll and extend in the direction of the length thereof. The roll is then clamped in a mold and vulcanized in cylindrical form, or preferably to conform to the cross-sectional contour of the inside of the tire casing, which completes the operation. The length of the roll will be such that two sections will extend completely around the tire casing as hereinbefore described.

The cotton strands 6 effectually resist the compressive action of the rubber so that the rubber will become compressed and not the strands, and it has a constant tendency to reassume its original form. The strands being very light, a large number, to replace equal volumes of rubber, may be employed, thereby reducing the weight of the filler materially.

I claim:

A tire filler consisting of a sheet of elastic material having an adhesive coating on one side, and strands of textile fabric laying in parallelism on the coated side of the sheet and secured by the coating, said sheet being rolled into cylindrical form to inclose the strands lengthwise in the roll, and said roll being shaped to obtain the cross-sectional contour of the inside of a tire.

In testimony whereof I affix my signature.

FRANK A. NAGEL.